March 11, 1941.  A. H. DE SHONG  2,234,520
PACKING
Filed May 23, 1940  2 Sheets-Sheet 1
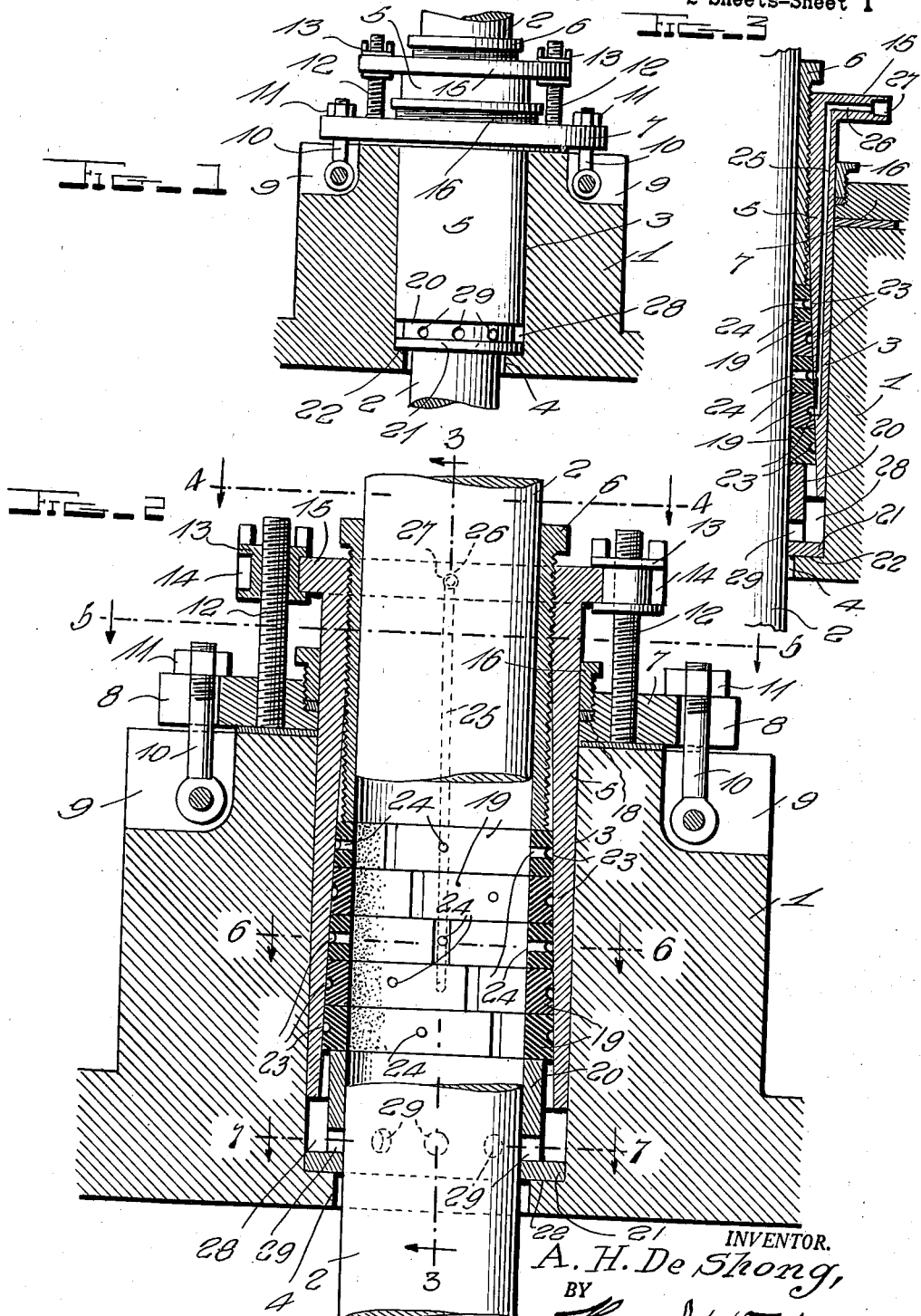
INVENTOR.
A. H. De Shong,
BY
Ross J. Woodward
Attorney

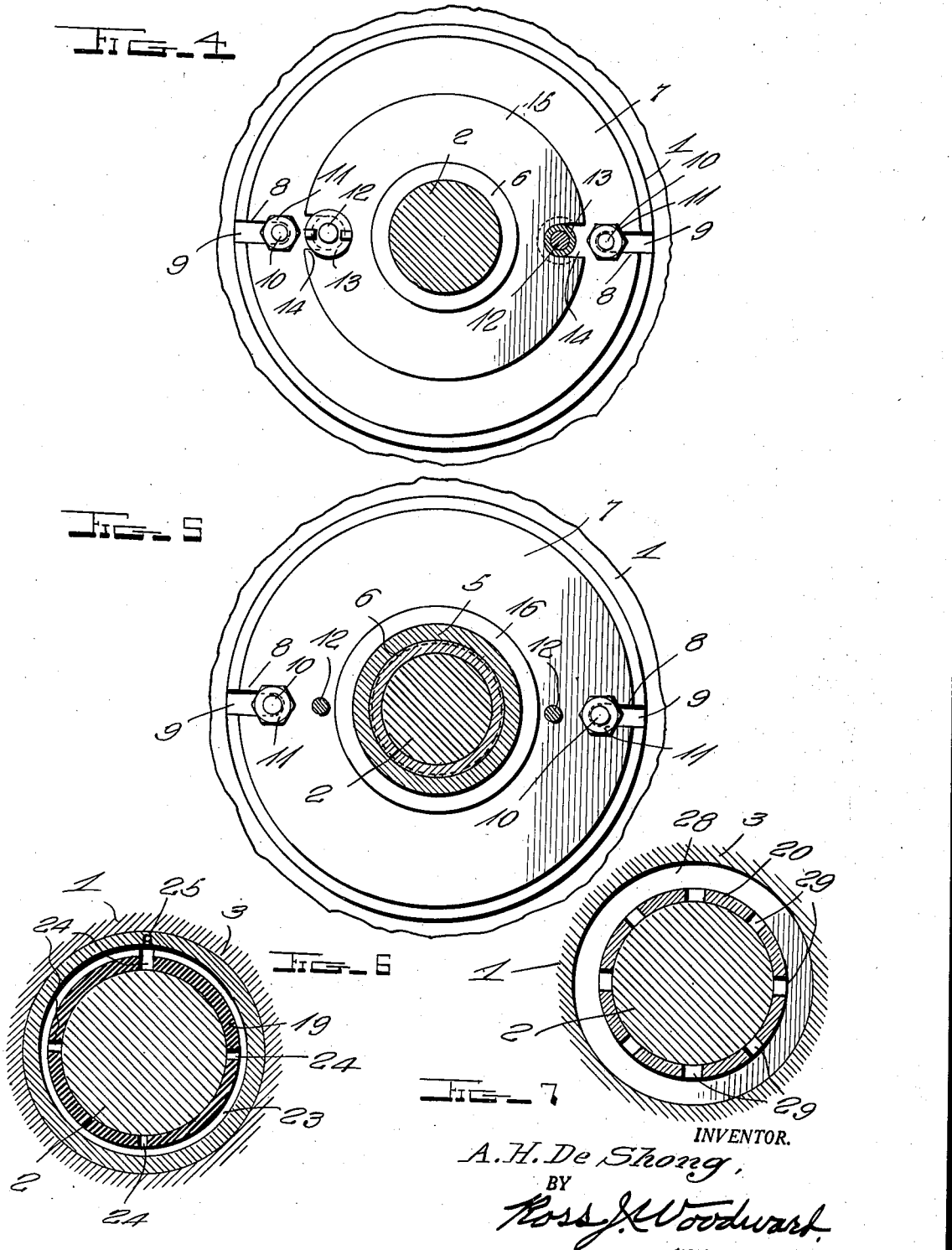

Patented Mar. 11, 1941

2,234,520

UNITED STATES PATENT OFFICE 2,234,520

PACKING

Arthur H. De Shong, Dumas, Tex.

Application May 23, 1940, Serial No. 336,853

4 Claims. (Cl. 286—33)

This invention relates to an improved packing and more particularly to a shaft packing, it being one object of the invention to provide a packing of such construction that a tight seal may be formed about a shaft and, at the same time, allow the shaft to turn or slide easily in the packing.

Another object of the invention is to provide a packing wherein the packing rings are housed in a sleeve carrying an inner sleeve so mounted that it may be adjusted through the first sleeve and the rings compressed tightly about a shaft.

It is another object of the invention to so mount the outer sleeve that it may be longitudinally through the body of the packing and held in adjusted position therein, means being also provided for forming a tight seal about the outer sleeve and preventing leakage.

Another object of the invention is to provide improved means at the inner end of the packing for backing up the packing rings and in addition form a pocket to receive sediment which may gather in the packing.

Another object of the invention is to provide a packing which may be easily taken apart for cleaning or replacement of packing rings therein and then easily reassembled to form a tight seal about a shaft.

Another object of the invention is to provide the outer sleeve of the packing with oil passages through which oil may be delivered to the packing rings, the rings being formed with external oil grooves and also with transverse perforations through which oil is delivered onto a shaft passing through the packing.

Another object of the invention is to provide a packing which is simple in construction and very efficient in operation.

The invention is illustrated in the accompanying drawings wherein:

Fig. 1 is a view showing the packing mounted about a shaft in operative relation thereto.

Fig. 2 is a sectional view taken longitudinally through Fig. 1.

Fig. 3 is a fragmentary longitudinal sectional view taken on the line 3—3 of Fig. 2 and showing the oil passage formed longitudinally in the outer sleeve of the packing.

Fig. 4 is a view on the line 4—4 of Fig. 2.

Fig. 5 is a view taken transversely through the packing on the line 5—5 of Fig. 2.

Fig. 6 is a sectional view taken transversely through the packing on the line 6—6 of Fig. 2.

Fig. 7 is a sectional view taken transversely through the packing on the line 7—7 of Fig. 2.

The body 1 through which the shaft 2 passes may constitute a portion of a wall or the like or a separate body mounted against or through a wall in any desired manner. This body is formed with a bore or passage 3 having a reduced inner end portion 4, and from an inspection of Figs. 1 and 2 it will be seen that the bore is of even diameter from its outer end to its reduced inner end. The sleeve 5 of the packing is of an external diameter adapting it to fit snugly in the bore 3 and internally, the sleeve is tapered from its inner end for the major portion of its length and terminates in an outer end portion which is of even diameter and threaded to receive an externally threaded nipple 6. A disc 7, formed of thick metal, fits about the sleeve 5 and is disposed against the front of the body 1 with a sealing gasket between confronting faces of the body and the disc to form a tight seal. Slots 8 are formed in the disc radially thereof to register with recesses or pockets 9 formed in the body and in the pockets are pivotally mounted bolts 10 which are of a length adapting them to be swung into place through the slots 8. The nuts 11 may be then tightened to force the disc into compressing engagement with the gasket and firmly but detachably hold the disc against the outer end face of the body 1. Threaded stems 12 extend outwardly from the disc in spaced relation to inner ends of the slots 8 and carry flanged wing nuts which are rotatably received in slots 14 formed in the outstanding annular flange 15 at the outer end of the sleeve 5. By turning the nuts 13 in a tightening direction, the sleeve may be forced inwardly through the bore 3 and, by turning the nuts in an opposite direction, the sleeve may be shifted outwardly. After the sleeve has been adjusted to desired position, a gland 16, which fits snugly about the sleeve and is threaded into a pocket 17 formed in the disc, is tightened to compress the packing 18 and form a tight seal between the sleeve and the disc.

A plurality of packing rings 19 fit about the shaft 2 within the sleeve 5 and are confined between the inner end of the nipple 6 and backing ring 20 having a flanged end 21 bearing against the annular shoulder 22 surrounding the reduced end 4 of bore 3. The fact that the sleeve is gradually reduced in thickness toward its inner end causes it to serve as an annular wedge and when the sleeve is shifted inwardly, the packing rings will be compressed about the shaft to form a tight seal. Each of the packing rings 19 is formed about its outer side edge face with a circumferentially extending oil groove 23 from which extend perforations or oil inlets 24 through which oil is delivered onto the shaft 2. An oil passage 25 is formed longitudinally through the sleeve 5 and, at its outer end has a side extension 26 terminating in a mouth 27 through which oil or other lubricant is fed into the oil passage. The inner end portion of the oil passage is provided with lateral outlets through which oil is delivered to the oil grooves of the packing rings. The inner end of the sleeve 5 terminates in spaced relation to the flanged end of the backing ring 20 to form a pocket or sump 28 for receiving sediment which passes into the pocket through openings 29 formed in the backing ring or sleeve 20.

Having thus described the invention, what is claimed is:

1. In a packing structure, a body formed with a bore, a sleeve fitting snugly in said bore and shiftable longitudinally therein with a portion projecting outwardly from the bore and provided with an outstanding annular flange having slots leading from its outer peripheral edge, a disc about said sleeve having slots leading from its outer peripheral edge, bolts pivotally carried by said body for passing through the slots of said disc and holding the disc firmly against the outer end of said body when nuts of the bolts are tightened, a packing gland carried by said disc and fitting snugly about said sleeve, stems carried by said disc and extending outwardly therefrom through the slots in the flange of said sleeve, nuts carried by said stems and seated in the slots of the sleeve with portions of the nuts engaging the sleeve for shifting the sleeve longitudinally through the bore when the wing nuts are turned, packing in said sleeve for fitting about a shaft, and a nipple in said sleeve shiftable longitudinally therein for applying pressure to the packing longitudinally of the sleeve.

2. In a packing structure, a body formed with a bore having a reduced inner end portion and a shoulder surrounding said reduced inner end portion, a sleeve snugly received in and shiftable longitudinally in the bore, a disc fitting snugly about said sleeve and removably secured against the outer face of said body, the sleeve being shiftable through the disc, means carried by said disc for shifting the sleeve longitudinally through the disc and the bore and holding the sleeve in adjusted position, packing in said sleeve for fitting about a shaft, a backing ring for said packing located in the inner end portion of said bore having a flanged end seated against the shoulder surrounding the reduced inner end of the bore, said backing ring being spaced from walls of the bore to form a pocket at the inner end of the bore and having a portion extending into the sleeve in spaced relation to walls thereof for engaging the packing and adjacent its flanged end being formed with side openings communicating with the unobstructed inner end portion of the bore between the flange of the backing ring and the inner end of said sleeve, and a nipple threaded into the sleeve through the outer end thereof and shiftable longitudinally in the sleeve for confining the packing in the sleeve about a shaft between the nipple and the backing ring.

3. In a packing structure, a body formed with a bore, a sleeve extending into the bore through the outer end thereof and shiftable longitudinally therein, packing rings in said sleeve formed with circumferentially extending grooves in their outer side edge faces and lubricant passages extending transversely through the packing rings, said sleeve being formed with a longitudinally extending lubricant passage leading from its outer end and having its inner end portion provided with outlets opening through the sleeve in position for delivering lubricant into the grooves of the packing rings, and means for shifting the sleeve longitudinally in the bore and holding the sleeve in adjusted position.

4. In a packing structure, a body formed with a bore, a sleeve extending into the bore through one end thereof and shiftable longitudinally therein, packing rings in the sleeve for fitting about a shaft passing through the sleeve, said packing rings being formed with lubricant passages, the sleeve being formed with a longitudinally extending lubricant passage for delivering lubricant to the packing rings, and means for shifting the sleeve longitudinally in the bore and holding the sleeve in adjusted position.

ARTHUR H. DE SHONG.